(12) United States Patent
Srinivasan et al.

(10) Patent No.: US 7,188,171 B2
(45) Date of Patent: Mar. 6, 2007

(54) METHOD AND APPARATUS FOR SOFTWARE AND HARDWARE EVENT MONITORING AND REPAIR

(75) Inventors: Karamadai Srinivasan, Rocklin, CA (US); Rajpal Gill, Rocklin, CA (US); Thomas M. Tripp, El Dorado Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 10/349,773

(22) Filed: Jan. 23, 2003

(65) Prior Publication Data

US 2004/0148385 A1   Jul. 29, 2004

(51) Int. Cl.
    *G06F 15/13* (2006.01)
(52) U.S. Cl. .................. 709/224; 709/27; 709/318; 705/10
(58) Field of Classification Search ............... 709/224, 709/27, 318; 705/10
    See application file for complete search history.

(56) References Cited

U.S. PATENT DOCUMENTS

| 5,557,740 | A | 9/1996 | Johnson et al. | |
|---|---|---|---|---|
| 6,243,833 | B1 | 6/2001 | Hitchcock et al. | |
| 6,434,616 | B2 * | 8/2002 | Urano et al. ............... | 709/224 |
| 6,538,996 | B1 | 3/2003 | West et al. | |
| 6,539,499 | B1 | 3/2003 | Stedman et al. | |
| 6,584,502 | B1 * | 6/2003 | Natarajan et al. ........... | 709/224 |
| 6,598,179 | B1 | 7/2003 | Chirashnya et al. | |
| 6,859,783 | B2 * | 2/2005 | Cogger et al. ................ | 705/10 |
| 6,950,964 | B1 | 9/2005 | McMichael et al. | |
| 2002/0010803 | A1 * | 1/2002 | Oberstein et al. ........... | 709/318 |
| 2002/0059310 | A1 | 5/2002 | Choi | |
| 2002/0067504 | A1 | 6/2002 | Salgado et al. | |
| 2002/0152430 | A1 | 10/2002 | Akasaka et al. | |
| 2003/0037288 | A1 | 2/2003 | Harper et al. | |
| 2003/0229406 | A1 * | 12/2003 | Maity .......................... | 700/27 |
| 2004/0098714 | A1 | 5/2004 | Metz | |
| 2004/0122940 | A1 * | 6/2004 | Gibson et al. .............. | 709/224 |
| 2004/0123188 | A1 | 6/2004 | Srinivasan et al. | |

* cited by examiner

*Primary Examiner*—Viet D. Vu
*Assistant Examiner*—Jinsong Hu (57) ABSTRACT

An integrated hardware and software monitoring system for a remote computer includes an event monitoring module loaded on the remote computer. The event monitoring module includes a hardware event detector that detects hardware events on the remote computer that may need attention, and a software service detector that detects status of software running on the remote computer to determine if any of the software has failed or is not operating properly, and to output a software event as a result thereof. The monitoring system also includes a data transmission system for performing a data transmission so as to notify a support specialist over a network connection of a hardware event or software event detected by the event monitoring module. The monitoring system further includes a graphical user interface provided on a display of the remote computer for allowing a user of the remote computer to make selections as to which software services and hardware events are to be detected.

16 Claims, 7 Drawing Sheets

METHOD AND APPARATUS FOR SOFTWARE AND HARDWARE EVENT MONITORING AND REPAIR

CROSS REFERENCE TO RELATED APPLICATIONS

This application is related to application Ser. No. 10/225,785, filed on Aug. 21, 2002, entitled "A Method And Framework For Service-Based Remote Support Delivery", and assigned to the same assignee as this application.

BACKGROUND OF THE INVENTION

1. Field of the Invention

The present invention relates to a method and apparatus for providing both software service monitoring and hardware event monitoring of a computer. In particular, the present invention relates to an apparatus and a method that performs notification and that can take corrective action to perform software and/or hardware repair, and that can also be configured to include other useful information regarding the computer in the notification to allow for an appropriate action to be determined for repairing the computer.

2. Description of the Related Art

There exist different types of conventional systems for notifying a support site of a problem with a remote computer, such as a problem with a remote server. For example, when an end user experiences a problem with his or her computer, the end user may telephone a designated number (e.g., 1-888-. . . ) in order to obtain assistance from a computer expert. The computer expert is typically physically located at a Support Site, whereby other computer experts are also physically located at the same Support Site in order to be able to assist more than one customer at the same time. The assistance provided may be a free service, or there may be a fee required. Typically, whether the assistance is free or not depends on whether the telephone call by the user is made during the warranty period (e.g., within three months of the purchase date of the computer).

When the user calls the designated telephone number to obtain assistance from a computer expert, the user is provided assistance from the computer expert in order to correct the problem with the user's computer. The user typically may have to wait on the telephone line for a period of time, while the computer expert researches the computer problem described by the user and develops possible solutions to that problem. The computer expert may review manuals that describe various computer problems and possible solutions to those problems, and/or the computer expert may query other computer experts at the Support Site for their advice in solving the problem.

There also exist conventional systems for providing on-line support to an end user. For example, if an end user is experiencing a problem with his or her computer, such as a problem with his or her Hewlett-Packard HP Vectra™ computer, the end user has the option to contact an HP Support Specialist by way of an Internet connection. Such an Internet connection may be provided by using software tools produced by Motive Communications, Incorporated. One such software tool is called ServiceNet, which is designed around a self-help paradigm in which a person using a desktop computer notices a problem and then manually opens a "trouble ticket" that is transmitted to a support provider.

In one implementation of ServiceNet, when a user of a personal computer (PC) detects a problem, the user clicks on a "service" icon (on the user's desktop or within an application, for example) that causes a web browser to bring up a web-based user interface that provides the user with a form into which the user may enter a description of the problem. This forms the "trouble ticket" described previously. The PC operator uses a web interface to report the problem to a program called Chorus Client, which is an incident escalator. The incident escalator first may try to run prewritten diagnostic scripts or provide "self-help" tools. It may then "isolate" the incident, running scripts to gather configuration data, and then combining the user's problem description and the configuration data with contact information identifying the user of the computer and including such things as name, e-mail address, and telephone number. It may also gather host information from the PC. These are transmitted to an incident receiver which parses the information and passes it on to a central analysis server. At the central analysis server, a program called Duet, in combination with a program called Insight, enables the provision of "online" assistance by a service engineer to review the problem in the context of the user's computer as configured and to provide assistance. Each separate incident report is assigned a case number, and there may be many different case numbers being acted on by one or more service engineers at the same time.

In the above-described conventional system, the end user has to physically notify a support engineer (either by telephone or by an Internet connection) of a problem with his or her computer, and there is no convenient way for the end user's computer itself to automatically check for hardware or software errors and to provide a notification of such errors to a designated entity. Furthermore, there is no convenient way for the end user's computer to provide a particular type of notification based on a particular software or hardware problem being experienced, whereby the notification initiates a process to correct the particular problem.

SUMMARY OF THE INVENTION

According to one aspect of the invention, there is provided an integrated hardware and software monitoring system and method for a remote computer. The monitoring system includes a event monitoring module loaded on the remote computer. The event monitoring module includes a hardware event detector that detects hardware events on the remote computer that may need attention, and a software service detector that detects status of software running on the remote computer to determine if any of the software has failed or is not operating properly, to cause a software event. The monitoring system also includes a transmission system for notifying a support specialist over a network connection of a hardware event or software event detected by the event monitoring module. The monitoring system further includes a graphical user interface that provides a graphical user interface for allowing a user of the remote computer to make selections as to which software services and hardware events are to be detected.

BRIEF DESCRIPTION OF THE DRAWINGS

The embodiments of the present invention will become more fully apparent from the following detailed description when read in conjunction with the accompanying drawings with like reference numerals indicating corresponding parts throughout, wherein.

DETAILED DESCRIPTION OF THE INVENTION

Different embodiments of the invention will be explained below with reference to the accompanying drawings.

The present invention relates to a system and method for providing an integrated solution that monitors both software services and other software processes running on an end user's machine, as well as monitoring hardware events that occur on the end user's machine. For example, the present invention may be provided for a network server that is disposed at a remote location, in order to provide automatic notification as to any network server problems and to provide corrective actions to be taken.

Figure 1:
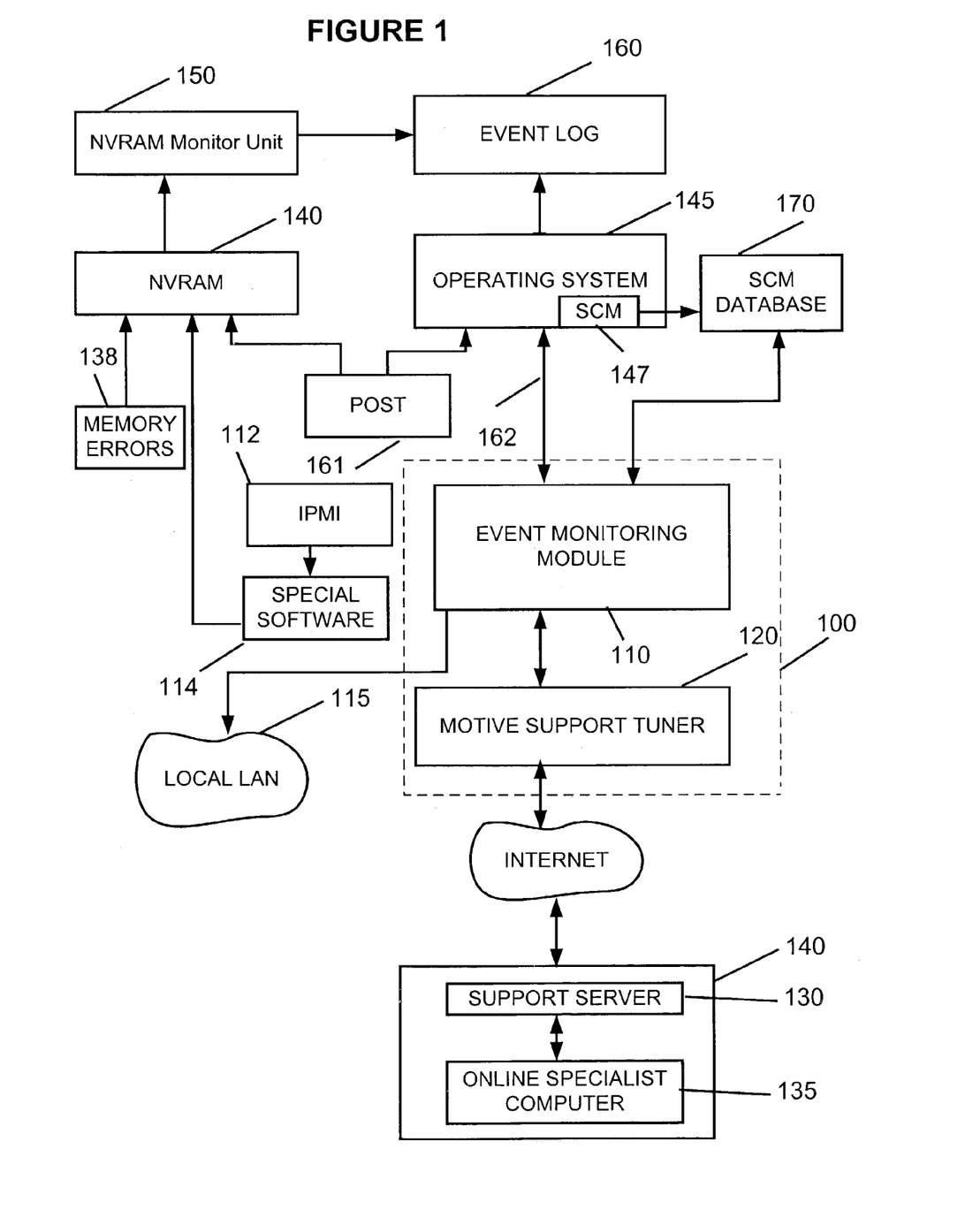
FIG. 1 is a diagram showing elements utilized in a system in accordance with a first embodiment of the invention.

Referring now to FIG. 1, there is shown a monitoring system 100 for an end user computer according to a first embodiment of the invention. The monitoring system 100 includes an Event Monitoring Module 110. The Event Monitoring Module 110 is a software package that runs on the end user computer. The Event Monitoring Module 110 performs monitoring of software applications running on the end user computer, and monitoring of hardware events occurring on the end user computer.

Figure 2:
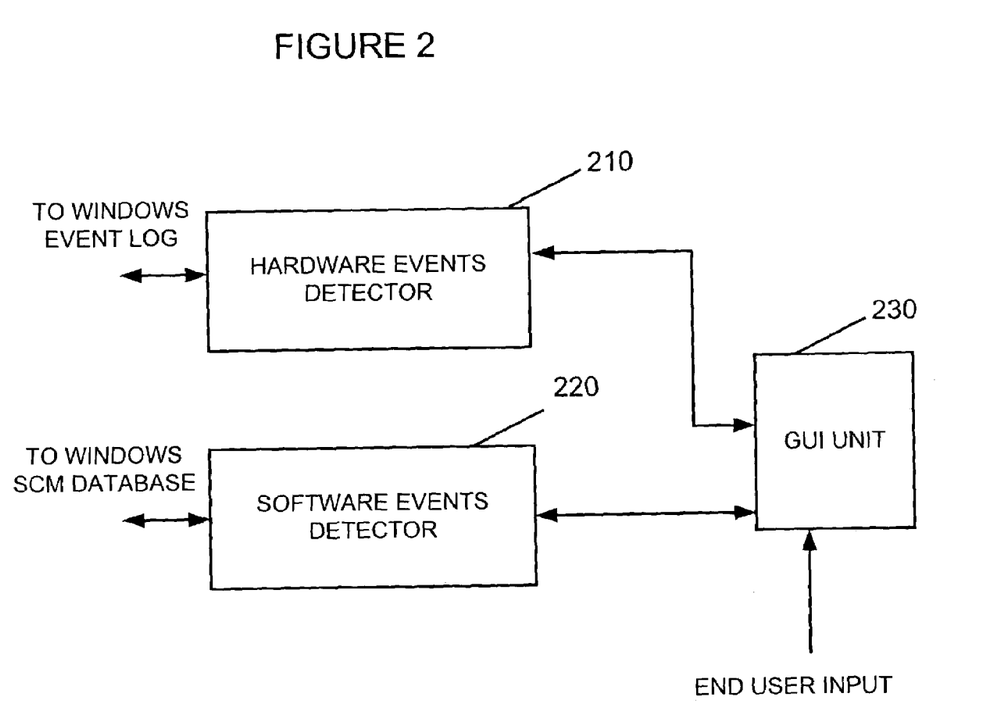
FIG. 2 is a diagram showing elements of an event monitoring module utilized in the first embodiment of the invention.

As shown in FIG. 2, the Event Monitoring Module 110 includes a hardware events detector 210, a software events detector 220, and a graphical user interface (GUI) unit 230. The hardware events detector 210 detects hardware events on the end user computer, and the software events detector 220 detects software status of software services running on the end user computer. The graphical unit interface unit 230 provides GUI displays for the end user to make selections as to what types of notification and/or corrective actions to take.

Referring back to FIG. 1, the system 100 also includes a network communications unit 120, which is also referred to as a Motive Support Tuner in the first embodiment since it provides an interface to an on-line message delivery scheme supported by software of Motive Communications, Inc. (also referred to as "Motive Support Technology" software). The network communications unit 120 in the first embodiment provides a secure communications link between the end user computer and a Support Site, whereby information concerning the end user computer, as output by the Event Monitoring Module 110, is received by the network communications unit 120, is encrypted along with other data (e.g., end user computer type, end user computer serial number, end user name, warranty information, etc.), to be sent over a network connection (e.g., via an http connection made over the Internet) to the Support Site 140. At the Support Site 140, the information is stored at a Support Server 130, whereby an online specialist can review the information (by way of online specialist computer display 135), determine an appropriate action to take, and notify the end user of actions to take in order to correct a problem occurring at the end user computer.

In this regard, the system 100 according to the first embodiment is configured to be compatible with Motive Support Technology software, to provide a comprehensive computer monitoring service to clients using Windows™-based computers. For example, such a system can be used to provide monitoring for remote servers. The health of a network server can be monitored and critical hardware failures and software failures can be prevented by taking proactive actions based on the hardware and software events reported by the system 100 according to the first embodiment.

In one possible implementation of the first embodiment, the Event Monitoring Module 110 monitors software running on the end user computer and also monitors hardware events occurring on the end user computer based on an IPMI (Intelligent Platform Management Interface 112) architecture, which is well known to those of ordinary skill in the computer art. IPMI 112 defines common interfaces to "intelligent" hardware used to monitor a server's physical health characteristics, such as temperature, voltage, fans, power supplies and chassis. The Event Monitoring Module 110 runs as a service on the end user computer that is to be monitored. After the Event Monitoring Module 110 software is installed on the end user computer, and after the end user opens the Event Monitoring Module 110 (e.g., by the end user clicking on an icon on a display of the end user computer, or by the end user downloading the software from a particular Internet web site), the end user is then provided with a Graphical User Interface (GUI) on the computer display allows the end user to select hardware events and software services to be monitored and the type of corrective actions (if any) are to be taken.

The Event Monitoring Module 110 is configured to obtain information concerning all software services that are installed on the end user computer, whereby this information is provided to the Event Monitoring Module 110 by an Operating System (OS) Layer Application Program Interface (API). With this information, once the Event Monitoring Module 110 is enabled, the end user is provided with a GUI display showing all of the software services that can be monitored, and the end user can then select any of these software services to be monitored.

For both software services and hardware events to be monitored, the end user can select a combination of actions to be performed when such software/hardware events are detected by the Event Monitoring Module 110. If an action requires notification of an online support specialist, then the Motive Support Tuner 120 is utilized in order to provide a secure communications link to a Support Site, such as via an http connection over a secure Internet link. The Motive Support Tuner 120 receives information concerning the software event or hardware event to be packaged in a message to be sent to a support specialist (or call agent) at the Support Site, and whereby the message also includes information concerning the specifics of the end user computer. Such specific end user computer information may include the end user name, any warranty information, the type of end user computer, the serial number of the end user computer, etc. This information is very useful to the Support Specialist in determining an optimal solution to fix a problem with the end user computer that resulted in the occurrence of the software event or the hardware event.

The software services running on the end user computer are monitored periodically by querying the Operating System (e.g., Windows™) Control Manager at a predefined polling interval, whereby this interval is preferably settable by the end user by way of a GUI display that is provided to the end user when the Event Monitoring Module 110 is enabled. For example, a polling interval in the range of from five minutes to ten minutes may be utilized. The polling interval time is preferably selected so as to not be too long (so as to not detect any end user computer problems fast enough) and not too short (so as to tie up network and end user computer resources due to the monitoring and data transfer).

Referring now to FIG. 1, a Non-Volatile Random Access Memory (NVRAM) 140 is provided on the end user computer, and is used to record particular hardware events occurring on the end user computer, in a manner known to those of ordinary skill in the art. For example, single bit memory errors 138 are stored as hardware events and logged into the NVRAM 140. An NVRAM monitoring unit 150 periodically monitors the NVRAM 140 for any new hardware events that have been logged into the NVRAM 140, whereby those new hardware events are logged into the Operating System (e.g., Windows™) Event Log 160. Some hardware errors occurring on the end user computer are determined during system startup by running a Power On Self Test (POST) routine 161 during running of the Basic Input Output System (BIOS), whereby any memory errors are detected and logged into the NVRAM 140. The POST routine 161 will only transfer control to the Operating System (OS) 145 of the end user computer if no correctable errors are detected. If one or more errors are detected, then the POST routine 161 will try to fix those errors before transferring control to the OS 145. Other hardware events can be detected by special software 114 running on the end user computer (and that adheres to the IPMI 112 architecture, for example), whereby those hardware events are also logged into the NVRAM 140.

As explained above, the NVRAM monitoring unit 150 runs as a software service on the end user computer, and monitors the NVRAM 140 for any new records. When a hardware event occurs and is logged into the NVRAM 140, the event is picked up from the NVRAM 140 by the NVRAM monitoring unit 150 and logged into the Windows™ Event Log 160. The logging of this information into the Windows™ Event Log 160 causes the Operating System 145 to output a "NotifyChangeEventLog" event 162 when the Operating System 145 is a Windows™ Operating System. The "NotifyChangeEventLog" event 162 is detected, whereby the Event Monitoring Module 110 is notified of this event and woken up. In particular, in a Windows™ environment, the Microsoft Win32 API causes the output of the "NotifyChangeEventLog" event 162 to be written into an Event Log 160, whereby the Event Monitoring Module 110 is woken up by the Win32 API performing this writing to the Event Log 160.

For detecting software events, the Event Monitoring Module 110 periodically queries a Windows™ Service Control Manager (SCM) database 170 to determine if the status of any software running on the end user computer is such that such software is running improperly or has failed. A Windows™ Service Control Manager (SCM) 147 keeps track of all software processes running on the end user computer, and it updates the SCM database 170 whenever a particular software process malfunctions or experiences some other type of problem.

Based on the type of corrective action to take as a result of the particular hardware event detected, the Motive Support Tuner 120 is utilized if the end user has made a selection on a GUI display that an online support specialist is to be notified by way of a network connection (e.g., by way of the Internet). By way of example and not by way of limitation, other types of user-selectable corrective actions may include: 1) reboot the computer, 2) notify IT staff at the end user company by way of an e-mail sent via a local LAN 115, and/or 3) notify the end user by way of an e-mail sent via the local LAN 115 or by providing a visual and/or audible alert on the end user computer.

If the Motive Support Tuner 120 is to be utilized to notify a support specialist as to the hardware problem being experienced, then the command line option in the Motive Support Tuner 120 is invoked, whereby all pertinent information regarding the end user computer is obtained by the Motive Support Tuner 120 and included in a message that is submitted over a secure network connection to the support specialist (at the Support Site 140). This inclusion of pertinent end user computer information is very useful, since in conventional systems the end user has to physically enter in such information into the message when the end user initiates an online service connection with the Support Site 140. In contrast, in the present invention, the automatic invoking of the commanding line option of the Motive Support Tuner 120 allows for pertinent end user computer information to be automatically accumulated and included in a message that is sent to a support specialist.

Upon receipt of the message (output from the Motive Support Tuner 120) that includes a description of the hardware or software event as well as the pertinent end user computer information, a support specialist can then come up with an appropriate corrective action to fix a hardware problem that resulted in the hardware event being detected by the Event Monitoring Module 110. For example, the support specialist may have the ability to remotely run a specific "repair" program on the end user computer to try to solve the hardware problem at the end user computer.

Unlike conventional monitoring and repair systems and methods whereby hardware event information obtained during running of the POST routine 161 is provided to a support specialist, the present invention provides the capability to provide both hardware event information and software service information to any of a variety of locations, and to provide any of a variety of corrective actions, based on options chosen by the end user. Furthermore, by use of the Motive Support Tuner 120 and its usage of well known http calls to communicate in a secure manner over the Internet, the present invention can communicate with a particular support specialist, such as a Hewlett-Packard (HP) Support Specialist, whereby hardware and/or software event information passes through an HP firewall on its way to an HP Support Site.

Similarly, based on end user selection, a corrective action may be adopted whereby Information Technology (IT) personnel of the end user's company will be notified and will attempt to take corrective action to fix the hardware and/or software problem on the end user computer. Also, the present invention provides a mechanism to notify a particular person, whether it be the end user, an IT specialist working at the end user's company, an on-line support specialist, or some other specialist, of a problem with the end user computer before that problem becomes a catastrophic problem. That way, the end user computer may be fixed, so as to maintain the integrity of a computer network (especially if the end user computer is a network server on the computer network, for example).

Figure 3:
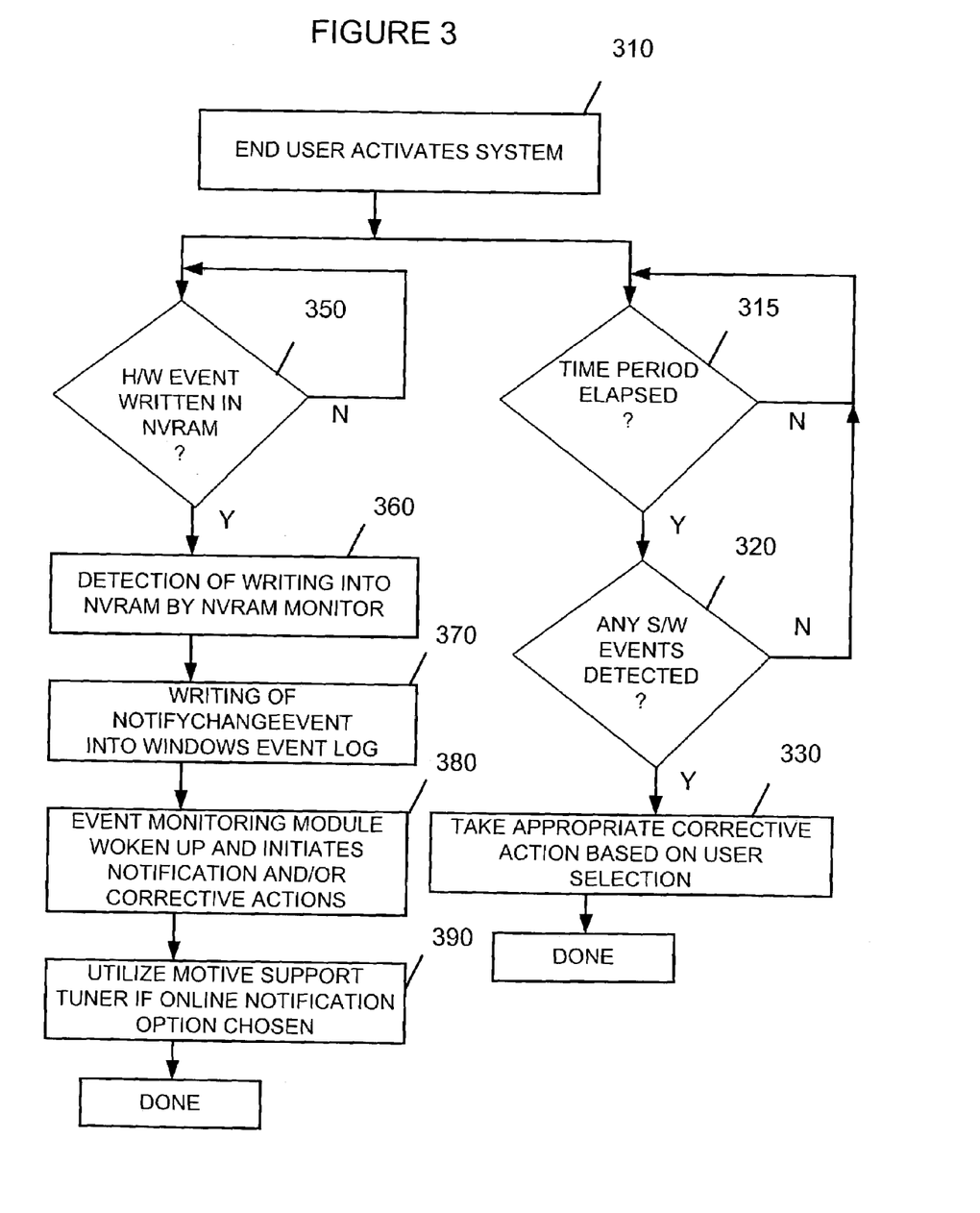
FIG. 3 is a flow diagram showing steps utilized in a method according to the first embodiment of the invention.

A method according to the first embodiment will now be described, with reference to FIG. 3. In a step 310, the end user activates the system on his/her computer (either by clicking on an icon on the end user computer display if the pertinent software had been previously downloaded onto the end user computer, or by downloading the pertinent software from a particular web site). Once activated, the end user is provided with GUI screens (see FIG. 5, for example) on the end user computer display in order to make selections as to hardware events and software services to be monitored, as well as the types of notifications and/or corrective actions to take with respect to each of the selected items. After waiting a prescribed period of time (Yes in step 315), in step 320, the Event Monitoring Module 120 queries the Windows™ SCM database 170 to determine whether any of the selected software processes are not operating properly (which would correspond to a software services event for a selected software service being detected by the Operating System). If one or more of the selected software processes are not operating properly (Yes in step 320), then the appropriate notification and/or corrective action is performed (step 330), which may involve the activation of the Motive Support Tuner 120 if an online support specialist is to be notified of this software event. If a hardware event is written into the NVRAM 140 (Yes in step 350) at any time while the end user computer is ON, then the NVRAM monitor 150 detects this writing to the NVRAM 140 (step 360), and causes a writing to the Windows Event Log 160 of a "NotifyChangeEvent" (step 370). The writing to the Windows Event Log 160 causes a waking up of the Event Monitoring Module 110, which performs the appropriate notification and/or corrective action to be taken (step 380), which may involve the activation of the Motive Support Tuner 120 if an online support specialist is to be notified of this hardware event via an http call (step 390).

In a second embodiment of the invention, notification to a support specialist over a separate network is not provided as an option, and thus no Motive Support Tuner is utilized. In the second embodiment, only the Event Monitoring Module 110 shown in FIG. 1 is provided to detect hardware and/or software events and to determine a user-selected corrective action to take. By way of example and not by way of limitation, such corrective actions may include: 1) reboot the end user computer, 2) notify the end user by way of an e-mail message, and/or 3) notify someone else on the local network on which the end user computer is connected who is experienced in solving a particular hardware or software problem.

Figure 4:
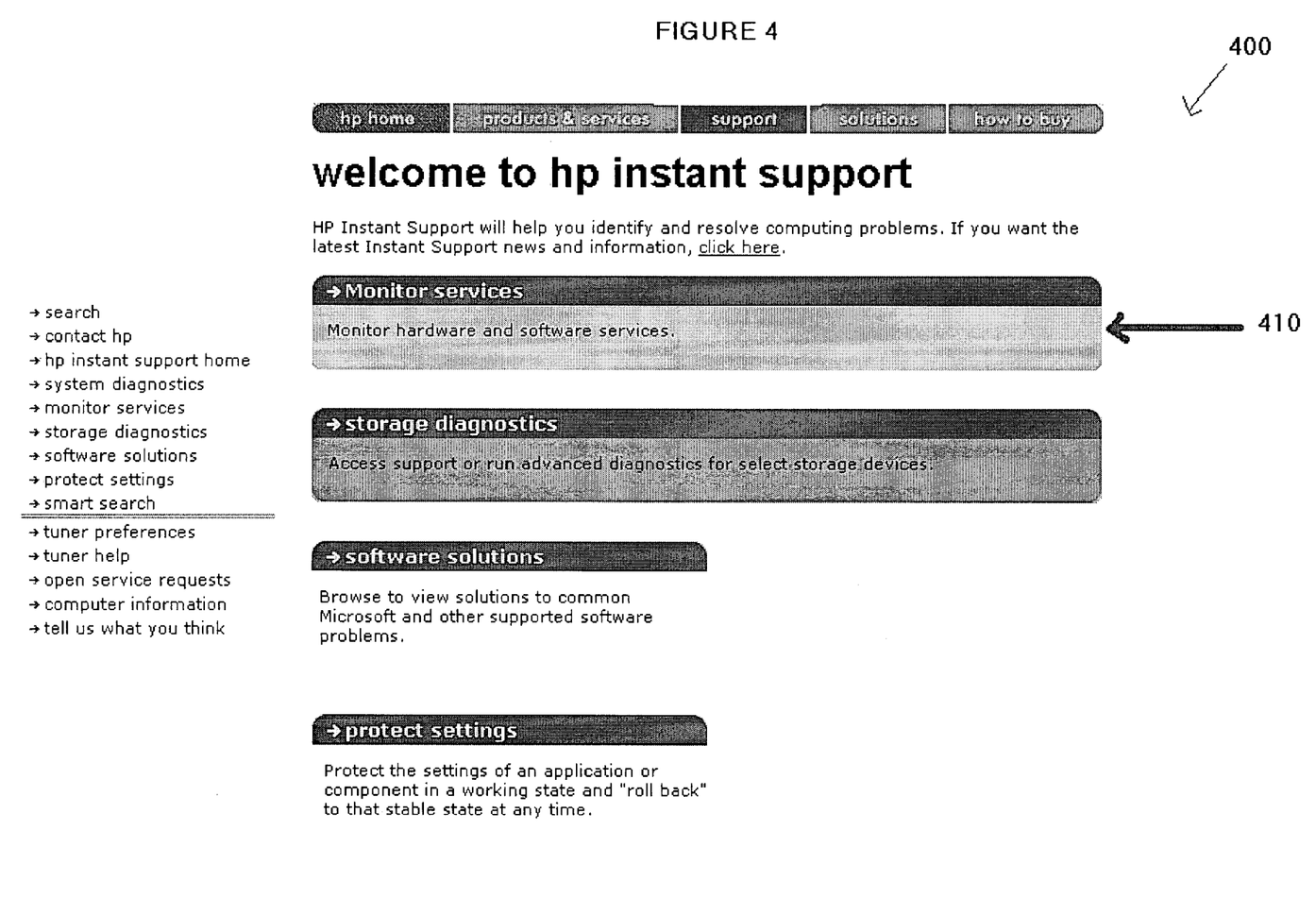
FIG. 4 is a graphical display of a web page from which a software application according to the first embodiment of the invention can be downloaded onto an end user computer.
Figure 5:
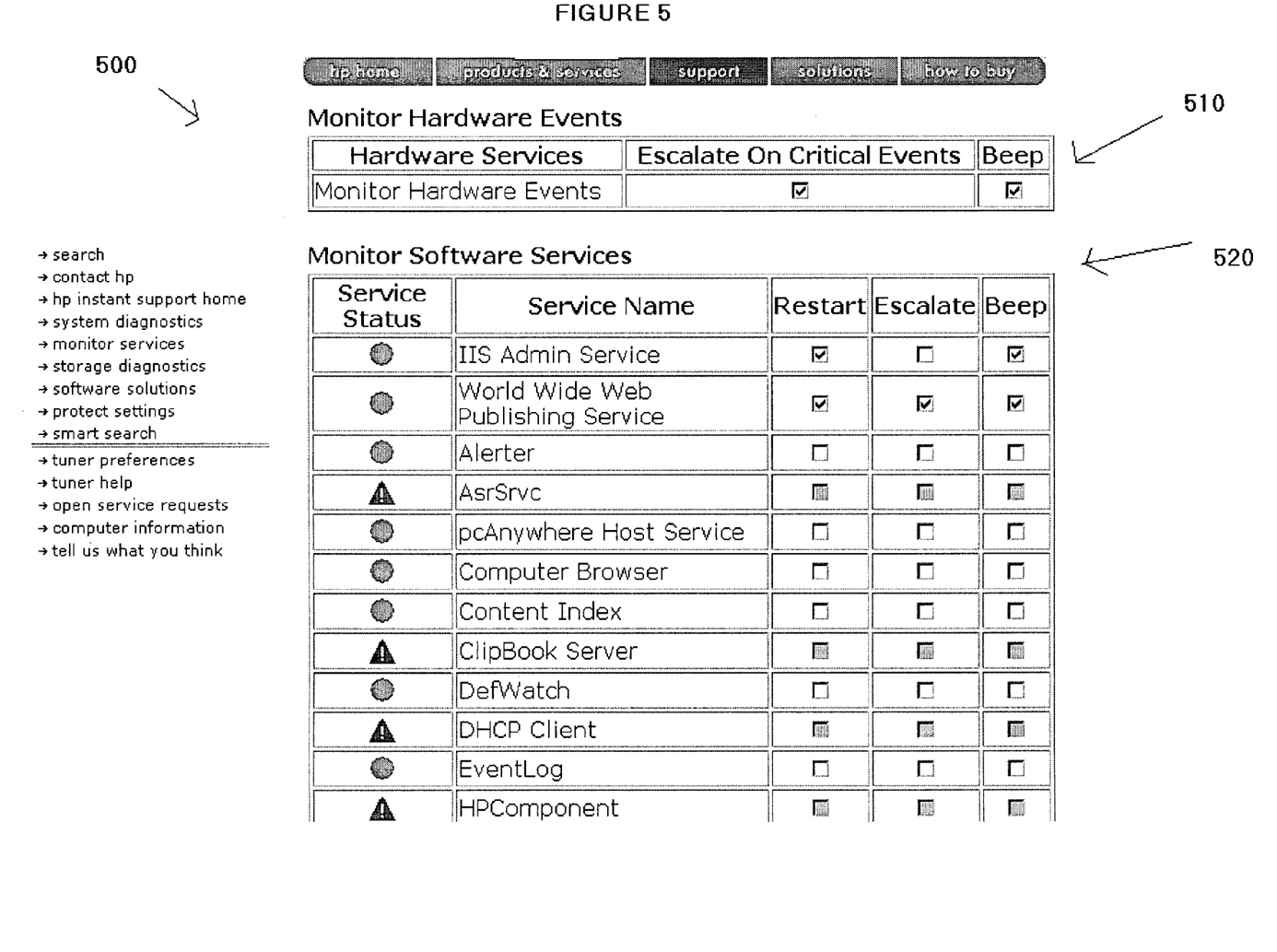
FIG. 5 is a graphical display showing one possible implementation of a screen by which an end user can select hardware events and software services to be monitored and the types of corrective actions to be taken.

FIGS. 4–7 shows one possible implementation of the system according to one or more embodiments of the invention. FIG. 4 shows a web page 400 by which an end user can download the software onto the end user computer. The web page is shown as being a web page on Hewlett-Packard's web site. After navigating to this particular web page, the end user selects the "Monitor services" 410, in order to download software to monitor hardware and software services on the end user computer When the "Monitor services" option is chosen, the application is downloaded onto the end user's computer (e.g., a JAVA application), and it checks for all the installed software services and their current state. This information is shown in FIG. 5, which shows one possible display implementation 500 of how such information may be presented to the end user by the system. For "Monitor Hardware Events" 510, the end user can configure the system to either the HP Support Center (online help aide) and/or simply alert the local administrator by beeping. For "Monitor Software Services" 520, the end user can configure the system to either restart the particular service, reboot the computer, notify the HP Support Center, and/or simply alert the local administrator by beeping.

Figure 6:
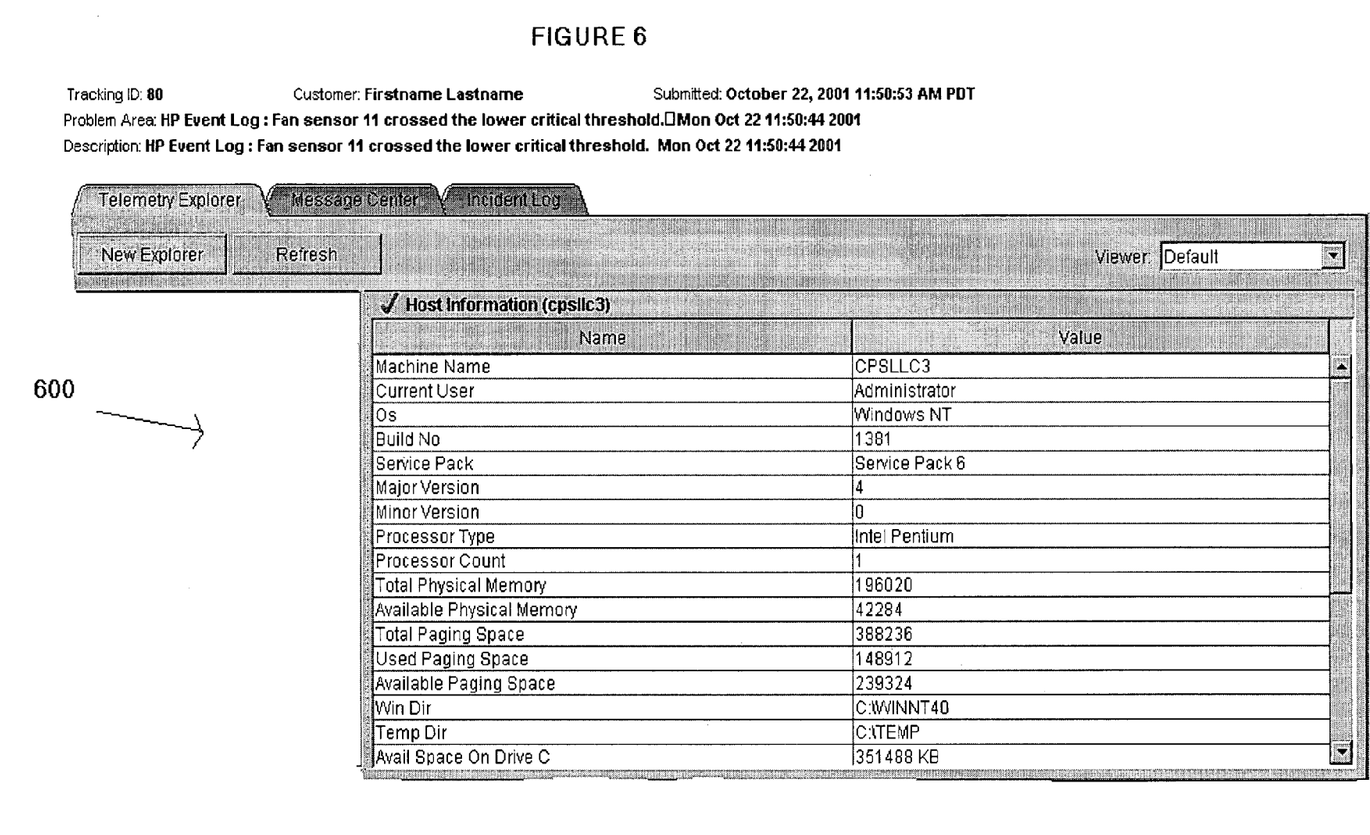
FIG. 6 is a graphical display showing one possible implementation of a screen which shows harvested information from an end user computer that is provided to an online support specialist when a hardware event occurs.

FIG. 6 shows one possible display implementation 600 that presents hardware event information that is harvested from the end user computer and that is provided to an online support specialist in the case of a hardware event (and in the case where the end user selected online support for hardware events). In this case, the hardware event is that a fan sensor had crossed a lower critical threshold. The online support specialist is provided with information concerning the end user computer, which is useful in determining a solution to the particular hardware event that was reported to the support specialist by way of the Motive Support Tuner 120 (over the Internet). If the end user did not select online support for hardware services, then this information is provided to the end user on the end user computer, and/or it is provided to a computer administrator of the end user's company by way of a local LAN.

Figure 7:
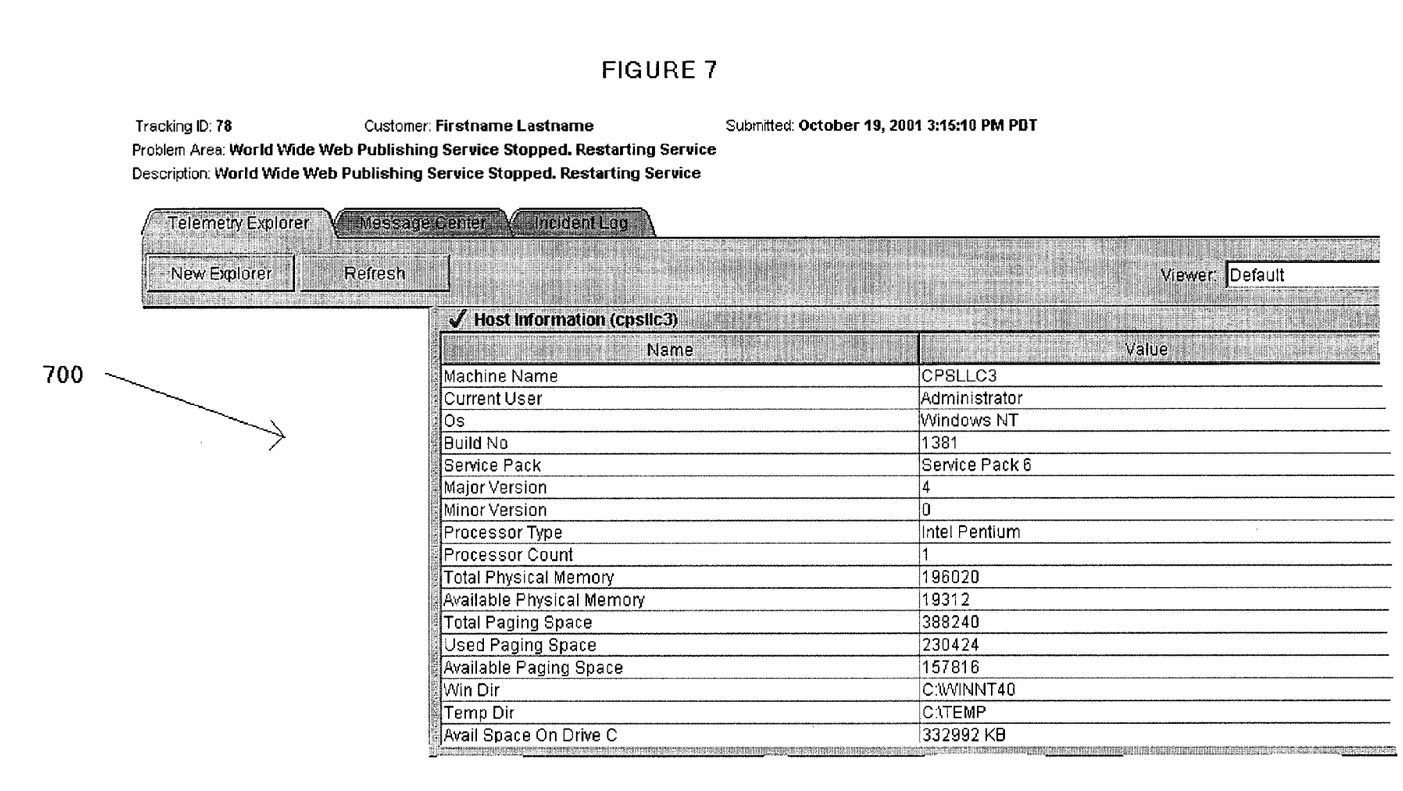
FIG. 7 is a graphical display showing one possible implementation of a screen which shows harvested information from an end user computer that is provided to an online support specialist when a software services event occurs.

FIG. 7 shows one possible display implementation 700 that presents software services information that is harvested and that is provided to an online support specialist in the case of a software services event (and in the case where the end user selected online support for this particular software service event). In this case, the software services event is that the World Wide Web Publishing service has stopped running on the end user computer. The online support specialist is provided with information concerning the end user computer, which is useful in determining a solution to the particular software services event that was reported to the support specialist by way of the Motive Support Tuner 120 (over the Internet). If the end user did not select online support for this particular software services event, then this information is provided to the end user on the end user computer, and/or it is provided to a computer administrator of the end user's company by way of a local LAN.

While different embodiments have been described herein, modification of the described embodiments may become apparent to those of ordinary skill in the art, following the teachings of the invention, without departing from the spirit and scope of the invention as set forth in the appended claims. For example, the present invention may be utilized with bus architectures other than IPMI, and it may be utilized with other operating systems other than Windows™ (e.g., Linux Operating System, UNIX, etc).

What is claimed is:

1. An integrated hardware and software monitoring system for a remote computer, comprising:
    an event monitoring module loaded on the remote computer,
    wherein the event monitoring module includes:
        a hardware event detector that detects at least one hardware event that has occurred on the remote computer, and
        a software service detector that detects status of software running on the remote computer to determine if any of the software has failed or is not operating properly, and to output a software event as a result thereof;
        a transmission system for performing a data transmission to notify a support specialist over a network connection of a hardware event or software event detected by the event monitoring module; and a graphical user interface unit that provides a graphical user interface for allowing a user of the remote computer to make selections as to which software services and hardware events are to be detected, wherein the graphical user interface also allows the user to make selections as to which types of corrective actions to be taken for selected ones of the software services and hardware events, the type of corrective actions including at least one of: a) a reboot of the remote computer, and b) an audible or visible alert being made at the remote computer.

2. The system according to claim 1, wherein the network connection is a secure connection over the Internet.

3. The system according to claim 1, wherein the hardware events are detected by the hardware event detector being notified of a writing of a NotifyChangeEvent log entry in a Windows Operating System Event Log.

4. The system according to claim 1, wherein the software service detector periodically checks a Windows Operating System Service Control Manager for status of particular software processes running on the remote computer.

5. The system according to claim 1, wherein the hardware event detector operates in a normally-sleep mode, and wherein, when a hardware event is written into a non-volatile RAM of the remote computer, the hardware event detector is woken up from the normally-sleep mode to an active mode, and wherein the hardware event detector reads data from the non-volatile RAM to determine if a hardware failure has occurred.

6. A method for monitoring hardware and software events on a remote computer, comprising:

determining whether an entry has been made to an Event Log on the remote computer which is indicative of an occurrence of a hardware event that has occurred on the remote computer;

periodically checking an Operating System Service Control Manager of the remote computer for current status of software running on the remote compute, and to determine if any software on the remote computer has failed or is not operating properly, and that outputs a software event as a result thereof;

determining whether or not a selection was made by an end user of the remote computer to provide a notification to a support site on an occurrence of the hardware event and/or the software event, and if so, outputting the software event and/or hardware event to the support site over a network, so that a support specialist at the support site can respond accordingly; and providing a graphical user interface on a display of the remote computer for allowing a user of the remote computer to make selections as to which software services and hardware events are to be detected, wherein the graphical user interface also allows the user to make selections as to which types of corrective actions to be taken for selected ones of the software services and hardware events, the type of corrective actions including at least one of: a) a reboot of the remote computer, and b) an audible or visible alert being made at the remote computer.

7. The method according to claim 6, wherein the hardware event is determined to have occurred by detecting a NotifyChangeEvent log entry in a Windows™ Operating System Event Log of the remote computer.

8. The method according to claim 6, wherein the determining of the hardware event comprises:

operating a hardware event detector of the remote computer in a normally-sleep mode;

writing a hardware event into a non-volatile RAM of the remote computer;

waking up the hardware event detector from the normally-sleep mode to an active mode; and reading data from the non-volatile RAM by the hardware event detector to determine if a hardware failure has occurred in the remote computer.

9. A computer program product for providing software service and hardware event monitoring for a remote computer, the computer program product being embodied in computer readable medium and executable by a computer, the computer program product comprising:

first program code for determining whether a particular event has been written into an Event Log of the remote computer that signifies an occurrence of a hardware event on the remote computer;

second program code for periodically checking an Operating System Service Control Manager of the remote computer for status of software that is running on the remote computer to determine if any of the software has failed or is operating improperly and therefore needs attention, and that outputs a software event as a result thereof;

third program code for, upon operator selection to notify a support site of the hardware event and/or software event, outputting information that includes the hardware event and/or software event, along with other information regarding the remote computer, to the support site over a network, so that a support specialist at the support site can respond accordingly; and fourth program code for providing a graphical user interface for allowing a user of the remote computer to make selections as to which software services and hardware events are to be detected, wherein the graphical user interface also allows the user to make selections as to which types of corrective actions to be taken for selected ones of the software services and hardware events, the type of corrective actions including at least one of: a) a reboot of the remote computer, and b) an audible or visible alert being made at the remote computer.

10. The computer program product according to claim 9, wherein the hardware events are detected by the first program code being notified of a writing of a NotifyChangeEvent log entry in a Windows Operating System Event Log.

11. The computer program product according to claim 9, wherein the second program code periodically checks a Windows Operating System Service Control Manager for status of particular software processes running on the remote computer.

12. The computer program product according to claim 9, wherein the determining of the hardware event comprises:

operating a hardware event detector of the remote computer in a normally-sleep mode;

writing a hardware event into a non-volatile RAM of the remote computer;

waking up the hardware event detector from the normally-sleep mode to an active mode; and reading data from the non-volatile RAM by the hardware event detector to determine if a hardware failure has occurred in the remote computer.

13. An apparatus for monitoring hardware and software events on a remote computer, comprising:

means for determining whether an entry has been made to an Event Log on the remote computer which is indicative of an occurrence of a hardware event that has occurred on the remote computer;

means for periodically checking an Operating System Service Control Manager of the remote computer for current status of software running on the remote compute, and to determine if any software on the remote computer has failed or is not operating properly, and that outputs a software event as a result thereof;

means for determining whether or not a selection was made by an end user of the remote computer to provide a notification to a support site on an occurrence of the hardware event and/or the software event, and if so, outputting the software event and/or hardware event to the support site over a network, so that a support specialist at the support site can respond accordingly; and means for providing a graphical user interface on a display of the remote computer for allowing a user of the remote computer to make selections as to which software services and hardware events are to be detected, wherein the graphical user interface also allows the user to make selections as to which types of corrective actions to be taken for selected ones of the software services and hardware events, the type of corrective actions including at least one of: a) a reboot of the remote computer, and b) an audible or visible alert being made at the remote computer.

14. The apparatus according to claim 13, wherein the graphical user interface also allows the user to select a polling interval time for periodically checking the Operating System Service Control Manager.

15. The apparatus according to claim 13, wherein the hardware event is determined to have occurred by detecting a NotifyChangeEvent log entry in a Windows™ Operating System Event Log of the remote computer.

16. The apparatus according to claim 13, wherein the means for determining whether an entry has been made to the Event Log on the remote computer operates in a normally-sleep mode, and wherein, when a hardware event is written into a non-volatile RAM of the remote computer, the means for determining whether an entry has been made to the Event Log on the remote computer is woken up from the normally-sleep mode to an active mode, and wherein the means for determining whether an entry has been made to the Event Log on the remote computer reads data from the non-volatile RAM to determine if a hardware failure has occurred.

* * * * *